Dec. 3, 1929.  C. W. VAN RANST  1,738,159
INTERNAL COMBUSTION ENGINE
Filed Aug. 7, 1923  3 Sheets-Sheet 1
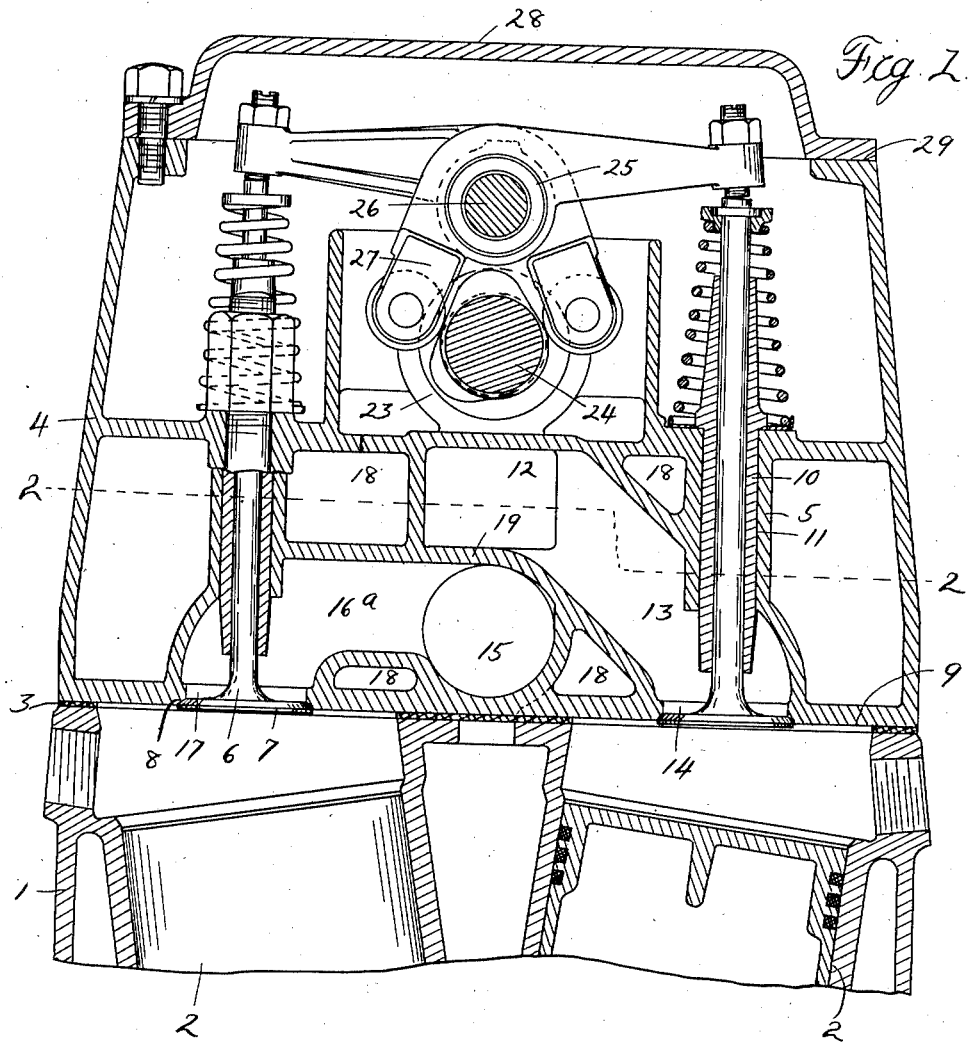
Inventor
Cornelius W. Van Ranst
By Whittemore Hulbert & Whittemore Belknap
Attorneys

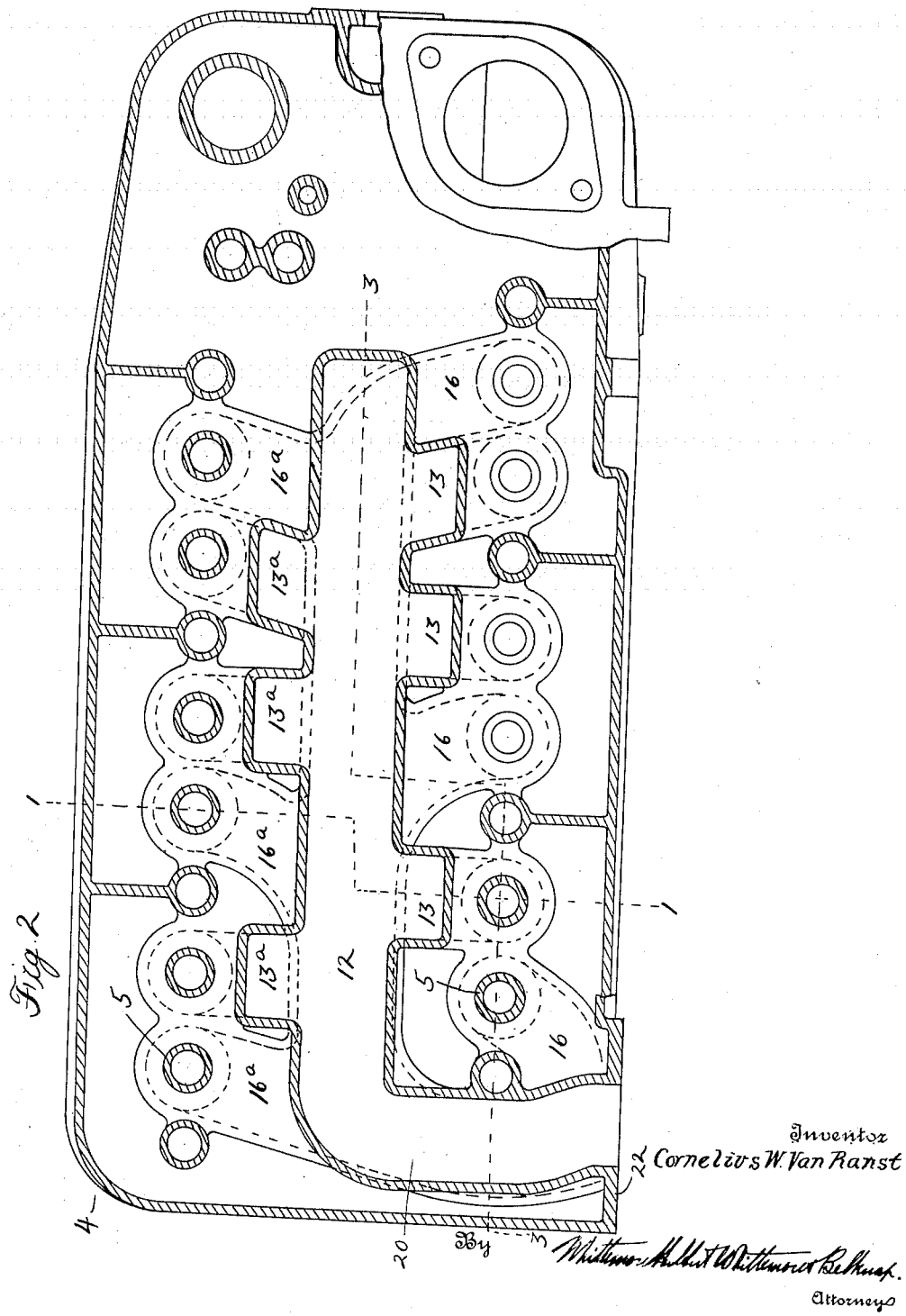

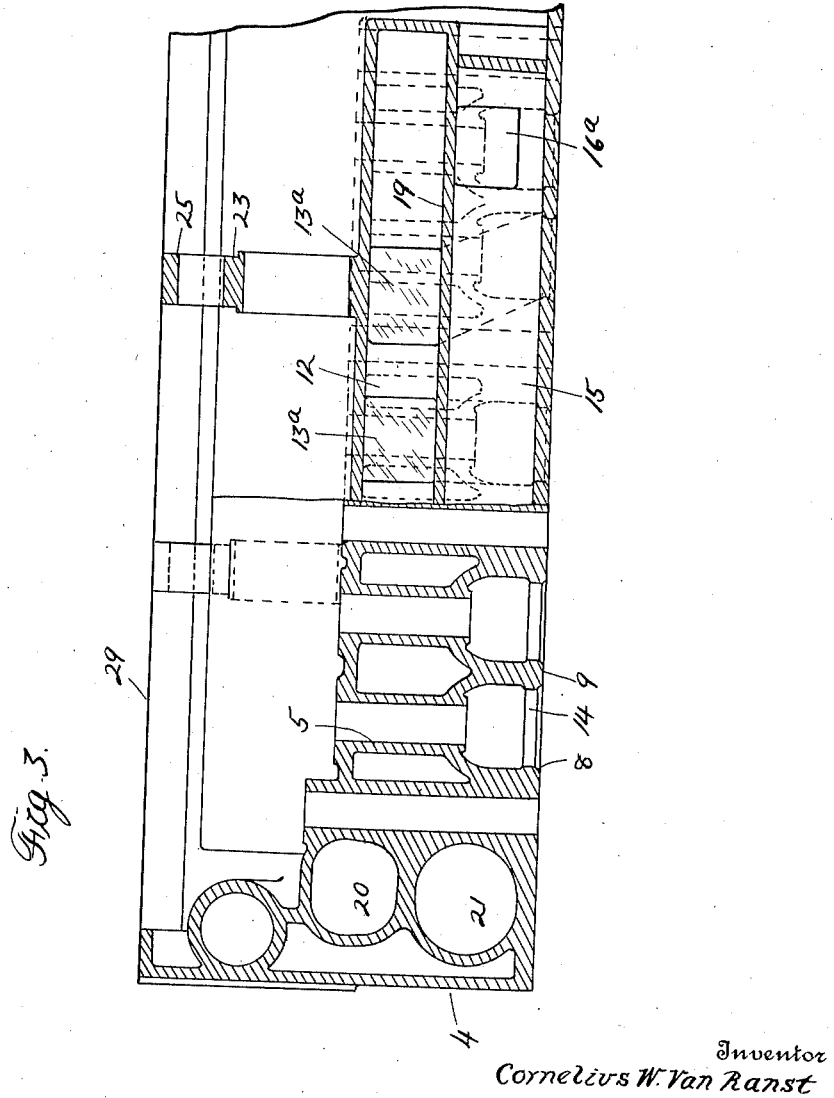

Patented Dec. 3, 1929

1,738,159

UNITED STATES PATENT OFFICE

CORNELIUS W. VAN RANST, OF DETROIT, MICHIGAN

INTERNAL-COMBUSTION ENGINE

Application filed August 7, 1923. Serial No. 656,193.

The invention relates to internal combustion engine construction in which the cylinders are arranged in V formation and have a relatively small included angle. Engines of this type are often provided with a single casting forming the head for all of the cylinders in both sides of the V and this application deals particularly with the improvements in design of such a head casting for securing more efficient operation of the engine.

The primary object of the invention is to provide an integral structure having the manifold construction formed as a part of the cylinder head and so arranged as to evenly distribute the fuel mixture to the respective cylinders without separation of fuel particles from the mixture. This object as well as others have been obtained by the novel features of construction, which are more fully hereinafter described.

In the drawings:—

Figure 1 is a transverse section through the cylinder head of the motor on the line 1—1 of Figure 2;

Figure 2 is a horizontal section on the line 2—2 of Figure 1;

Figure 3 is a longitudinal vertical section on line 3—3 of Figure 2.

1 represents a cylinder block having the cylinder bores 2 therein arranged at an angle of about 20° and having a plane upper surface 3 upon which is mounted a single head casting 4 forming the head for all of the cylinders in the block. In longitudinal section the cylinders are also preferably staggered, that is, the cylinders on opposite sides of the V are arranged in different transverse planes. The cylinder head 4 is provided with valve stem guides 5 in which are arranged the puppet valves 6 having the heads 7 seating in the valve seats 8 in the lower surface 9 of of the casting. The valve guides are so arranged that an inlet and an exhaust valve are located above each of the cylinders 2 and are preferably formed of bushings 10 arranged in the vertical bores 11 in the internal walls of the casting.

Extending centrally and longitudinally of the casting 4 is an inlet passageway 12 from which extend the branch passageways 13 and 13ª communicating with the ports 14 controlled by the inlet valves. 15 is an exhaust passageway also extending longitudinally of the head casting and arranged directly below the inlet passageway 12. Branch passageways 16 and 16ª lead from the exhaust passageway 15 and communicate with the ports 17 controlled by the exhaust valves and leading to the respective cylinders in the cylinder block.

Both the inlet and the exhaust passageways are formed by internal walls integral with the casting and there is also provided the cored out spaces 18 surrounding the manifolds and extending longitudinally of the casting forming water jackets through which the cooling water is circulated. The inlet conduit 12 is separated from the exhaust conduit 15 by the wall 19 which is common to both passageways and, therefore, transmits the heat from the exhaust gases to the inlet manifold. This is one of the features of the construction since, by maintaining the lower wall of the inlet conduit heated to some extent, any condensate which may form on the walls of the inlet manifold will be revaporized as soon as it comes in contact with the wall 19. On the other hand, the temperature of the mixture passing through the inlet manifold is not appreciably raised since the other sides of the manifold are cooled by the circulating water in the cored out spaces 18. The advantage of this construction is that it maintains the incoming fuel mixture in the same condition as it is when it issues from the carbureting means and the latter can be provided with any of the usual forms of vaporizing devices for initially obtaining the desired mixture.

At one end of the cylinder head the inlet and exhaust manifolds are provided with right angle turns 20 and 21 respectively, thereby providing access to the manifolds through the side wall 22 where they can be suitably connected to the carburetor and the exhaust manifold respectively. In addition to the integral manifold construction above described, the cylinder block 4 is provided with suitable journals 23 for the centrally arranged cam shaft 24 and the bearings 25 for the shaft 26 on which the rocker arms 27 are mounted to engage the cam shaft and actuate the valves 6. A cover member 28 is suitably secured to the upper surface 29 of the cylinder head, thereby completely enclosing the valve operating mechanism and completing the cylinder head structure.

What I claim as my invention is:—

1. In an internal combustion engine of the V type, the combination with opposite banks of cylinders having inlet and exhaust ports, of a removable block forming the head for both banks of cylinders, inlet and exhaust manifolds extending longitudinally through said head, the former being arranged above the latter, said inlet manifold having its lower wall in heat conducting relation with said exhaust manifold throughout the major portion of its length to vaporize condensate collecting thereon, the ends of both manifolds being closed at the same end of the cylinder block and both manifolds having their open ends at the opposite end of the cylinder block, water jackets surrounding the outer walls of said manifolds, and branch conduits from opposite sides of each of said manifolds communicating with the ports in both banks of cylinders.

2. In an internal combustion engine, a cylinder head for a plurality of cylinders having inlet and exhaust manifolds extending longitudinally therethrough and angularly bent at their corresponding ends to extend through the same side of the head, the inlet manifold being above the exhaust manifold and connected therewith by a common wall forming the bottom of the inlet manifold, said manifolds being otherwise separate from each other.

3. In an internal combustion engine, a cylinder head for a plurality of cylinders having cast therewithin a pair of longitudinally extending conduits, one above the other, the bottom of the upper conduit being formed integral with the top of the lower conduit, throughout its entire length, the said conduits being arranged to extend at adjacent points through the side of the cylinder head, said head being formed to have water spaces surrounding the outer walls of said conduits.

4. In an internal combustion engine of the V-type, the combination with opposite banks of cylinders having inlet and exhaust ports, of a removable block forming the head for both banks of the cylinders, inlet and exhaust manifolds extending longitudinally within said head, the former being arranged above the latter, said inlet and exhaust manifolds having a common wall forming the bottom of the former and the top of the latter, thereby forming a heated bottom wall for vaporizing condensate collecting on the same in the inlet manifold, said manifolds being of substantially the same length and extending through the same side of the head although being otherwise separate from each other.

5. The combination with an internal combustion engine, of the V-type having its cylinders in staggered relation to each other, of a head for said engine, said head comprising a casting having an exhaust manifold extending longitudinally therethrough adjacent the base thereof and having an intake manifold arranged immediately above the exhaust manifold with its lower wall forming the upper wall of the exhaust manifold, both the intake and exhaust manifolds being provided with right-angled bends adjacent corresponding ends to communicate with the said manifolds through a side of the head whereby the inlet of the intake manifold and the outlet of the exhaust manifold are adjacent each other, and both of the said manifolds being provided with oppositely extending branches communicating with the cylinders, the said head being further provided with water passages surrounding both of the said manifolds, valve stem guides cast in said head on opposite sides of the said manifolds, and bearings for a cam shaft and rocker arm shaft cast in said head above the said manifolds.

In testimony whereof I affix my signature.

CORNELIUS W. VAN RANST.